United States Patent
Crittenden (10) Patent No.: US 7,636,902 B1
(45) Date of Patent: Dec. 22, 2009

(54) REPORT VALIDATION TOOL

(75) Inventor: Forest V. Crittenden, Englewood, CO (US)

(73) Assignee: Sprint Communications Company L.P., Overland Park, KS (US)

(*) Notice: Subject to any disclaimer, the term of this patent is extended or adjusted under 35 U.S.C. 154(b) by 384 days.

(21) Appl. No.: 11/611,735

(22) Filed: Dec. 15, 2006

(51) Int. Cl.
*G06F 17/50* (2006.01)
*G06F 9/44* (2006.01)
*G06F 7/00* (2006.01)

(52) U.S. Cl. .............. 716/1; 716/2; 716/3; 716/4; 716/18; 717/124; 717/126; 717/127; 717/135; 707/1; 707/2; 707/3

(58) Field of Classification Search ........ 716/1, 716/4, 2, 3, 18; 705/1, 2, 7, 8, 10, 27, 34; 707/2, 3; 715/765; 717/124, 126, 127, 135
See application file for complete search history.

(56) References Cited

U.S. PATENT DOCUMENTS

| | | | |
|---|---|---|---|
| 6,145,121 A * | 11/2000 | Levy et al. ............... 717/135 |
| 6,490,620 B1 * | 12/2002 | Ditmer et al. ............ 709/224 |
| 6,615,258 B1 * | 9/2003 | Barry et al. .............. 709/223 |
| 6,714,539 B1 * | 3/2004 | Sbisa ....................... 370/385 |
| 6,714,915 B1 * | 3/2004 | Barnard et al. ............ 705/7 |
| 6,810,442 B1 * | 10/2004 | Lin et al. .................. 710/22 |
| 6,836,877 B1 * | 12/2004 | Dupenloup ............... 716/18 |
| 6,978,247 B1 * | 12/2005 | Bogart et al. .............. 705/8 |
| 7,058,600 B1 * | 6/2006 | Combar et al. ............ 705/34 |
| 7,069,184 B1 * | 6/2006 | Barger et al. ............. 702/186 |
| 7,107,285 B2 * | 9/2006 | von Kaenel et al. ...... 707/104.1 |
| 7,143,367 B2 * | 11/2006 | Eng .......................... 716/2 |
| 7,159,209 B1 * | 1/2007 | Srinivasan et al. ........ 717/126 |
| 7,203,671 B1 * | 4/2007 | Wong ........................ 707/2 |
| 7,203,929 B1 * | 4/2007 | Vinodkrishnan et al. .. 717/124 |
| 7,213,233 B1 * | 5/2007 | Vinodkrishnan et al. .. 717/124 |
| 7,216,340 B1 * | 5/2007 | Vinodkrishnan et al. .. 717/127 |
| 7,225,249 B1 * | 5/2007 | Barry et al. .............. 709/227 |
| 7,289,964 B1 * | 10/2007 | Bowman-Amuah ........ 705/1 |
| 7,315,826 B1 * | 1/2008 | Guheen et al. ............. 705/7 |
| 7,403,901 B1 * | 7/2008 | Carley et al. .............. 705/2 |
| 7,424,702 B1 * | 9/2008 | Vinodkrishnan et al. .. 717/124 |
| 7,467,198 B2 * | 12/2008 | Goodman et al. ......... 709/223 |
| 2002/0002560 A1 * | 1/2002 | Shah et al. ................ 707/200 |
| 2002/0165749 A1 * | 11/2002 | Northcutt et al. .......... 705/8 |
| 2004/0093261 A1 * | 5/2004 | Jain et al. ................. 705/10 |
| 2006/0004745 A1 * | 1/2006 | Kuhn et al. ............... 707/4 |
| 2006/0173754 A1 * | 8/2006 | Burton et al. ............. 705/27 |
| 2007/0094060 A1 * | 4/2007 | Apps et al. ................ 705/7 |
| 2008/0005689 A1 * | 1/2008 | Evernden et al. .......... 715/765 |
| 2008/0077552 A1 * | 3/2008 | Sanborn .................... 707/2 |

\* cited by examiner

*Primary Examiner*—Helen Rossoshek (57) ABSTRACT

A computer implemented method for validating reports is provided. A request to validate a report is received. At least one element of the report is mapped to a corresponding template of independently defined logic. At least one corresponding template of independently defined logic is applied to a system of record to generate data. Comparisons of the at least one element against the data are displayed.

20 Claims, 4 Drawing Sheets

FIG. 1

| First Report Projects 202 | Estimation Level of Effort 204 | Contract Level of Effort 206 |
|---|---|---|
| First Project 208 | 7,890 | 15,723 |
| Second Project 210 | 53,718 | 45,248 |
| Third Project 212 | 3,972 | 11,071 |
| Fourth Project 214 | 5,943 | 12,661 |
| Fifth Project 216 | 3,008 | 2,158 |
| Sixth Project 218 | 598 | 2,529 |

REPORT VALIDATION TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise generates reports for a variety of reasons. The utility of each report depends on the accuracy of the individual components of information in the report, or the elements of the report. The elements of the report can be inaccurate because of incorrect modifications to the information during the generation of the report, accidents in entering the logic for generating the report, fraud, or difference in the conversion of the elements and the generating logic between the system of record that contains the original information and the system that generates the report. Inaccuracies or errors can be common when a report is generated by a report-generating system that differs from the system of record, such as a report generated by a spreadsheet system that differs from the database system where the information for the spreadsheet originates. Some elements in reports can be based on elements from other reports, and not based directly on information from the system of record. The inaccuracies or errors for many elements in the report can be small enough to avoid easy detection but large enough to create problems for the enterprise relying on the accuracy of the report. Many reports include a large number of elements, or elements that are the results of complex calculations, such that validating the accuracy of individual elements is so difficult and time-consuming as to become prohibitive.

SUMMARY

Accordingly, there is disclosed herein various embodiments of a report validation tool and method. In some embodiments, a computer implemented method for validating reports is provided in which a request to validate a report is received. At least one element of the report is mapped to a corresponding template of independently defined logic. At least one corresponding template of independently defined logic is applied to a system of record to generate data. Comparisons of the at least one element against the data are displayed.

In another embodiment, the report validation tool is provided in the form of a computer system having a memory and a processor. The processor is configured to execute report checker software in the memory. The report checker receives a request to validate a report and maps at least one element of the report to a corresponding template of independently defined logic. The report checker also applies at least one corresponding template of independently defined logic to a system of record to generate data and displays comparisons of the at least one element against the data.

In yet another embodiment, a computer program product for a report validation tool is provided. The computer program product includes a computer readable medium having computer readable program code embodied therein. The computer readable program code is configured to receive a request to validate a report and to map at least one element of the report to a corresponding template of independently defined logic. The computer readable program code is also configured to apply at least one corresponding template of independently defined logic to a system of record to generate data and to display comparisons of the at least one element against the data.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

Embodiments of the present disclosure provide methods, systems and computer program products for a report validation tool. The report validation tool applies templates of independently defined logic, not derived from the logic used to generate the report, to validate the elements of the report. The templates of independently defined logic can include instructions that are native to the database used to generate the report. The report validation tool applies the templates of independently defined logic to the database to generate validated data, and displays comparisons of the elements of the report against the data. A user of the report can identify any errors in the report by viewing the comparisons, and can use the comparisons to determine the reasons for the errors in the report.

In some embodiments, the report validation tool can run automatically, randomly validating elements in reports, and validate elements of any report that exceed an error tolerance, which can be specified by the user of the report. For example, a spreadsheet system generates a report for which a spreadsheet erroneously uses a logical "and" instead of a logical "or" to generate one column of data for the report, an error not readily noticeable to the user. The automatically running report validation tool applies templates of independently defined structured query language logic to validate the elements of the report. The independently defined logic can be pre-defined logic, such as previously created logic, that can be used to validate the report. Because the report validation tool applies the structured query language logic to the structured query language database to generate validated data, the validated data is unaffected by the erroneous spreadsheet logic. In some embodiments, the user of the report can view the structured query language logic, the underlying data, and the comparisons between the validated data and the spreadsheet report to identify the erroneous "and" spreadsheet logic for the column of data in the report.

Figure 1:
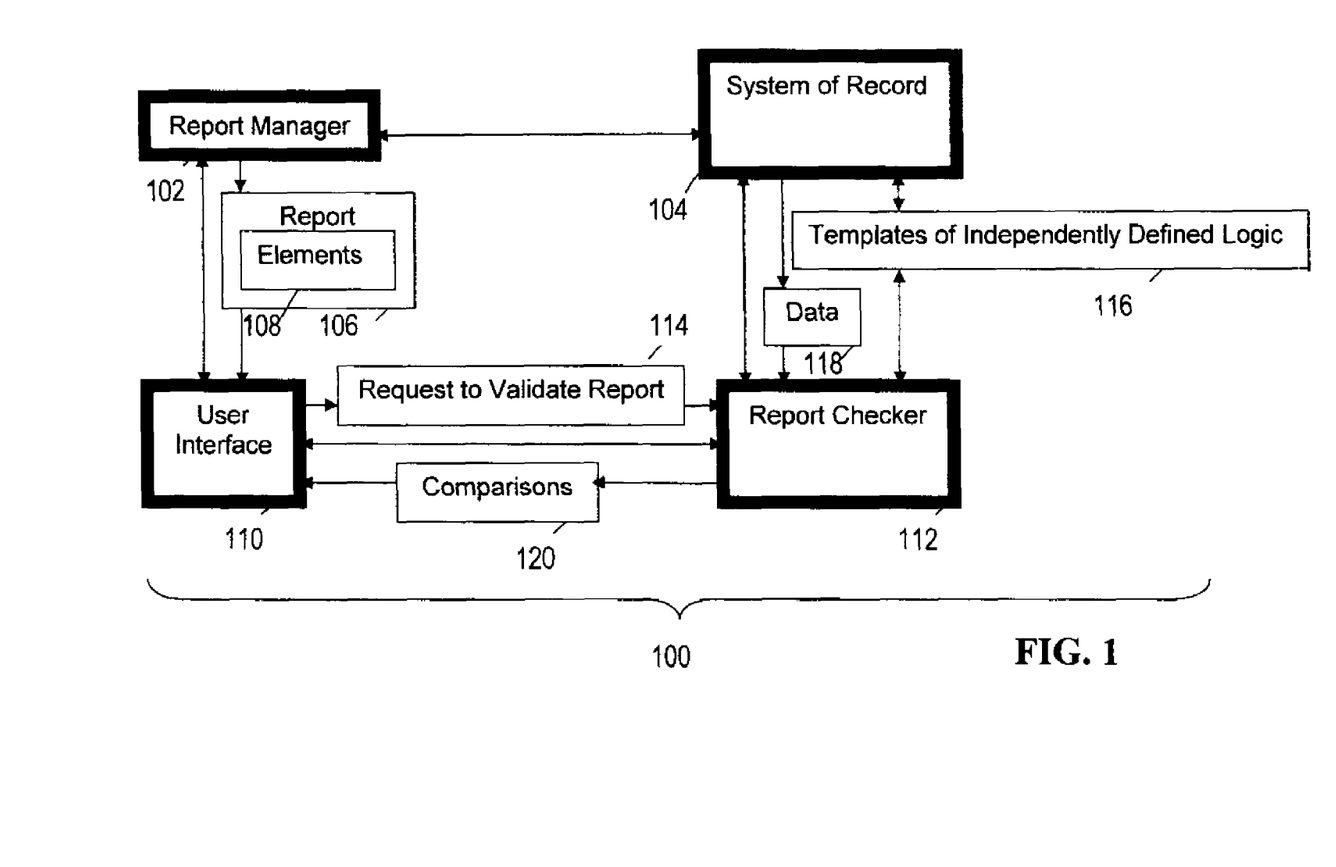
FIG. 1 shows an illustrative report validation system according to an embodiment of the present disclosure.

FIG. 1 shows illustrative system 100 for a report validation tool according to an embodiment of the present disclosure. Each of the components depicted in the system 100 are shown for the purpose of an illustrative example only, as the system 100 may include any number of each type of component. A report manager 102 is a software application that can access a system of record 104, or other derivative datastore, such as a database, to generate a report 106 that includes elements 108 based on information in the system of record 104 or derivative datastore. The report manager 102 can run automatically or require input from a user to access the system of record 104 to generate the report 106. The user can enter inputs to the report manager 102 through various input devices.

The report manager 102 can interact with a report checker 112 automatically to send a request to validate report 114 to the report checker 112 whenever the report manager 102 generates the report 106. Alternatively, a user can enter input via the user interface 110 to send the request to validate report 114 to the report checker 112. As yet another alternative, a user can interact directly with the report manager 102 to have it send the request to validate report 114 to the report checker 112. The report manager 102 can send the report 106 requiring validation to the report checker 112 when the request to validate report 114 is sent to the report checker 112, or the user can retrieve and forward the report 106 via the user interface 110.

The report checker 112 extracts the elements 108 from the report 106 and maps each element to a corresponding template of independently defined logic in templates of independently defined logic 116. The report checker 112 applies each corresponding template of independently defined logic in the templates of independently defined logic 116 to the system of record 104 to generate data 118. The report checker 112 compares the data 118 to the elements 108 and displays the comparisons 120 of the elements 108 against the data 118 through the user interface 110.

Although depicted in FIG. 1 as separate components, any features and capabilities of the user interface 110, the request to validate report 114, the templates of independently defined logic 116, the data 118, and the comparisons 120 can be combined or integrated in any combination as components in the report checker 112. Additionally, the templates of defined logic 116, the data 118, and the comparisons 120 can be combined or integrated in any combination as components in the system of record 104.

Figure 2:
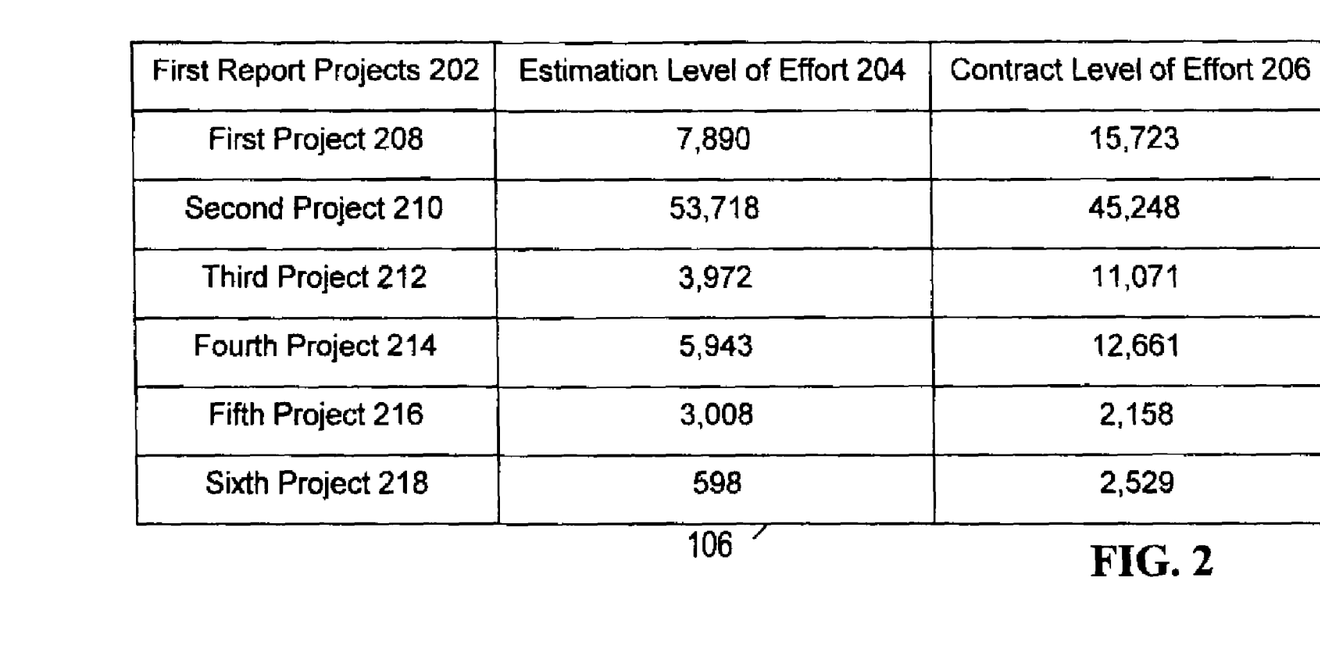
FIG. 2 shows an illustrative report.

FIG. 2 shows an illustrative report 106. The report 106 includes columns for first report projects 202, estimation level of effort 204, and contract level of effort 206. In this example, the estimation level of effort 204 depicts the estimated number of hours spent on a project, and the contract level of effort 206 depicts the number of hours for a project as specified in a contract. The report 106 also includes rows for a first project 208, a second project 210, a third project 212, a fourth project 214, a fifth project 216, and a sixth project 218.

The columns and rows depicted in the report 106 are shown for the purpose of an illustrative example only, as the report 106 can include any number of columns and rows. The report 106 depicts elements 108 for each type of information, such as the estimation level of effort 204, for each category of information, such as the second project 210, listed in the report 106 for a specified period of time. For example, the estimation level of effort 204 for the second project 210 is depicted in column 2 row 3 as the element 53,718 for a specified month. In another example, the contract level of effort 206 for the fourth project 214 is depicted in column 3 row 5 as the element 12,661 for the specified month. The report 106 depicts elements for a period of a month for the purpose of an illustrative example only, as the report 106 can depict elements for any time period.

Figure 3:
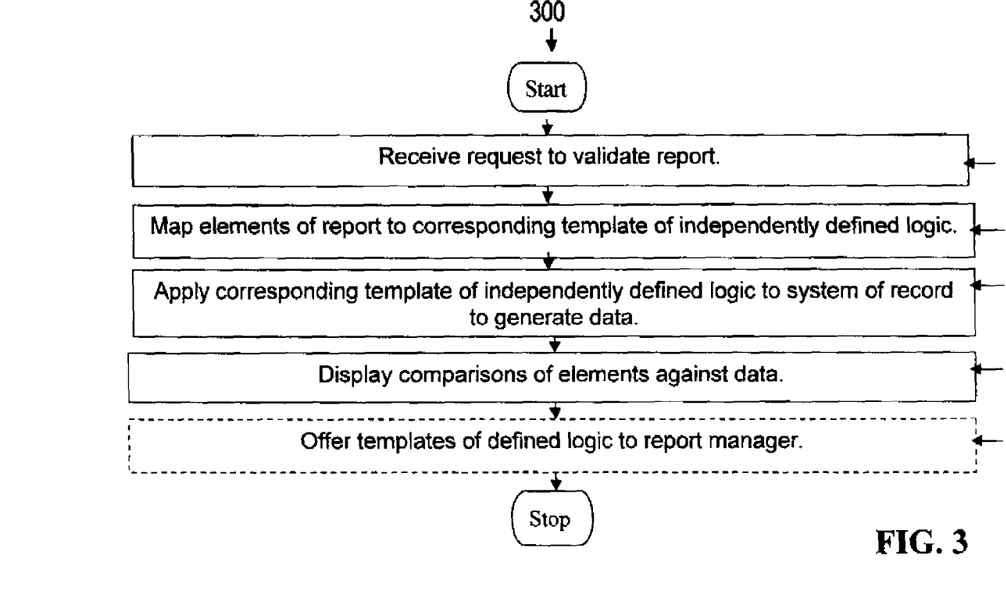
FIG. 3 shows an illustrative report validation method according to an embodiment of the present disclosure.

FIG. 3 shows an illustrative report validation method 300 according to an embodiment of the present disclosure. Applying the method 300 results in applying the templates of independently defined logic 116 to the system of record 104 to generate the data 118 to validate the elements 108 of the report 106.

In box 302, the report checker 112 receives the request to validate report 114. The report manager 102 can automatically send the request to validate report 114 to the report checker 112 whenever the report manager 102 generates the report 106. Alternatively, the user interface 110 can present a list of reports to a user for selection for report validation, where the user can be a user that generates reports or a user that validates reports. Upon selection by the user from the lists of reports, the user interface 110 sends the request to validate report 114 to the report checker 112 and the report manager 102 sends the report 106 to the report checker 112 through the user interface 110.

In box 304, the report checker 112 maps elements 108 of the report 106 to corresponding templates of independently defined logic 116. For example, the report checker 112 can enable a user to validate the report 106 that includes the elements 108 as depicted in FIG. 2. The user can be a user who generated the report 106 or a user who merely validates the report 106. The report 106 can specify the estimation level of effort 204 and the contract level of effort 206 for the projects 208-218, as depicted in FIG. 2. The corresponding templates of independently defined logic 116 can include a template of independently defined logic for estimation level of effort 204. The user maps the elements 108 for the estimation level of effort 204 for the projects 208-218 by specifying the projects 208-218 for the template of independently defined logic for the estimation level of effort 204. If none of the templates of independently defined logic 116 correspond to one of the elements 108 in the report 106, the user can create a template of independently defined logic 116 corresponding to the element using instructions native to the system of record 104 and verify that the newly created template of independently defined logic 116 generates accurate results. For this example, the independently defined logic 116 is not pre-defined logic because the user creates the independently defined logic 116 after the report 106 is generated. The user can verify that the newly created template of independently defined logic 116 generates accurate results because the newly created template of independently defined logic 116 includes instructions native to the system of record 104, in contrast to instructions used to generate the report 106, instructions native to a report-generating system that differs from the system of record 104. For example, the templates of independently defined logic 116 can include instructions in structured query language, instructions that are native to the system of record 104, which can be a database, and the report-generating system can be based on a spreadsheet that does not execute structured query language instructions.

Projects 208-218, the estimation level of effort 204, and the contract level of effort 206 are shown for the purpose of an illustrative example only, as the report 106 can include any number of rows and columns that report on any type of information for projects, applications, suppliers, individuals, or any other category of data. The user can also specify a time period for the template of independently defined logic 116 for estimation level of effort 204, such as the month specified for the report 106. Additionally, the report checker 112 can map only elements selected for validation from the elements 108 to corresponding templates of independently defined logic 116 if the user is interested in validating only a sub-set of the elements 108 in the report 106. When the report checker 112 maps elements 108 of the report 106 to corresponding templates of independently defined logic 116, the corresponding templates of independently defined logic 116 include information that identifies the types of information, the categories of information, and the time period for the information specified by elements selected for validation from the elements 108 in the report 106.

In box 306, the report checker 112 applies corresponding templates of independently defined logic 116 to the system of record 104 to generate the data 118. For example, the report checker 112 applies corresponding templates of independently defined logic 116 for the elements 108 of the report 106 to the system of record 104. The corresponding templates of independently defined logic 116 include information that identifies the types of information, the categories of information and the time period for the information specified by the elements 108 in the report 106, and instructions native to the system of record 104. For example, the report checker 112 applies corresponding templates of independently defined logic 116 for twelve elements of the report 106 depicted in FIG. 2. For this example, one of the corresponding templates of independently defined logic 116 includes information that identifies the estimation level of effort as the type of information, the projects 208-218 as the categories of information, and a specified month as the time period for the information. The result of applying such corresponding templates of independently defined logic 116 to the system of record is the generation of the data 118 for validating the elements 108 in the report 106. The generated data 118 is based on the original information in the system of record 104 and templates of independently defined logic 116 that have been verified to generate accurate results.

In box 308, the report checker 112 displays comparisons 120 of the elements 108 against the data 118 through the user interface 110. Additionally, the comparisons 120 can also include the underlying data used to generate the data 118 from the system of record 104. Although the report 106 depicted in FIG. 2. includes two types of information, the estimation level of effort 204 and the contract level of effort 206, for six categories of information, the projects 208-218, for a total of twelve elements 108 in the report 106, the report checker 112 may display only three of the comparisons 120. Only three of the potential twelve comparisons 120 may be displayed because the user selected only three of the elements 108 in FIG. 2 for validation. The user can specify the three elements 108 selected for validation or specify that three elements are randomly selected for validation. Alternatively, the report checker 112 may display only three of the potential twelve comparisons 120 even if the user selected all twelve of the elements 108 for validation if the user also specified a comparison tolerance for the comparisons 120, and only three of the comparisons 120 exceeded the comparison tolerance when comparing an element of the elements 108 to the corresponding data 118 for the element. This example describes the report checker 112 displaying only three of the comparisons 120 for the purpose of an illustrative example only, as the user can select any number of elements for the report checker 112 to validate, combined with any comparison tolerance for each selected element.

In box 310, the report checker 112 has the option of offering templates of independently defined logic 116 to the report manager 102 through the user interface 110. For example, when the report checker 112 displays comparisons 120 of elements 108 against the data 118 through the user interface 110, the report checker 112 can also display the corresponding templates of independently defined logic 116 for each of the comparisons 120 displayed. A user, whether the user is the user that generated the report 106 or the user that validates the generated report 106, can view the corresponding templates of independently defined logic 116 for each of the comparisons 120 displayed to determine any errors in the report 106 and any errors in the logic used for generating the report 106.

As another example, the report checker 112 offers the templates of independently defined logic 116 as part of a library of templates for independently defined logic 116 to the user that generates the report 106. The user can apply the templates of independently defined logic 116 to the system of record 104 to generate the data 118 that is used as the elements 108 in the report 106. Alternatively, if the report-generating system cannot use instructions native to the system of record 104, the user can duplicate the templates of independently defined logic 116 in a logic for the report 106 that is native to the report-generating system.

Figure 4:
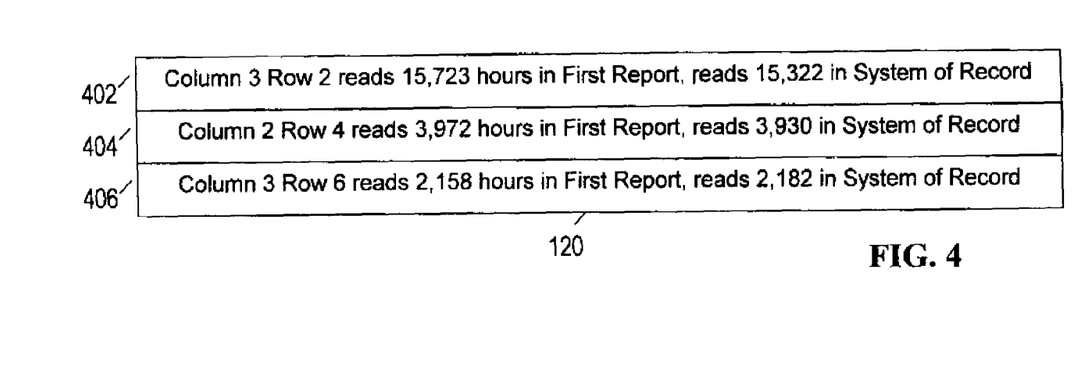
FIG. 4 shows illustrative comparisons according to an embodiment of the present disclosure.

FIG. 4 shows illustrative comparisons 120 according to an embodiment of the present disclosure. The comparisons 120 include a first comparison 402, a second comparison 404, and a third comparison 406. The individual comparisons 402-406 depicted in the comparisons 120 are shown for the purpose of an illustrative example only, as the comparisons 120 can include any number of individual comparisons. The elements and the data depicted in the comparisons 120 can be based on the elements 108 in the report 106 depicted in FIG. 2 and the data 118 generated from the system of record 104. For example, the second comparison 404 specifies that "Column 2 Row 4 reads 3,972 hours in First Report, reads 3,930 in System of Record." The second comparison 404 can depict the element 108 for column 2 row 4 and the data 118 generated from the system of record 104 because the element 108 for column 2 row 4 differs from the corresponding data 118 by more than one percent, which can be a comparison tolerance specified when the user sent the request to validate report 114.

FIG. 4 may depict only the three comparisons 402, 404, and 406 of the potential twelve comparisons 120 from FIG. 2 because the user selected only three of the elements 108 in FIG. 2 for validation. Alternatively, FIG. 4 may depict only the three comparisons 402, 404, and 406 of the potential twelve comparisons 120 even if the user selected all twelve of the elements 108 for validation. The user may have specified a comparison tolerance for the comparisons 120, and only the comparisons 402, 404, and 406 exceeded the comparison tolerance when comparing all twelve elements in FIG. 2 to the corresponding data 118 for the elements 108. The comparisons 120 depicted in FIG. 4. are shown for the purpose of an illustrative example only, as the user can select any number of the elements 108 to validate combined with any comparison tolerance for each selected element.

Figure 5:
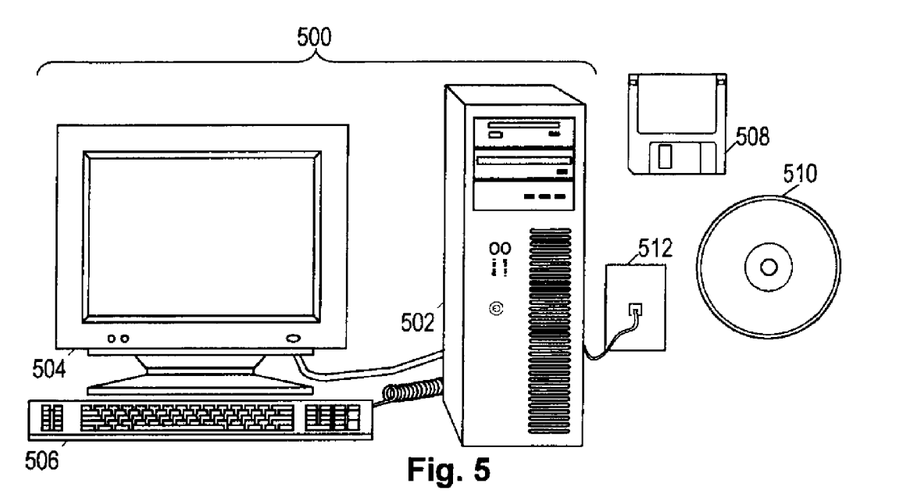
FIG. 5 shows an illustrative report validation tool embodied as a desktop computer.

FIG. 5 shows an illustrative system 500 for a report validation tool. The system 500 is shown as a desktop computer 500, although any electronic device having some amount of computing power coupled to a user interface and able to access various systems of record may be configured to carry out the methods disclosed herein. Among other things, servers, portable computers, personal digital assistants (PDAs) and mobile phones may be configured to carry out aspects of the disclosed report validation methods.

As shown, the system 500 comprises a chassis 502, a display 504, and an input device 506. The chassis 502 comprises a processor, memory, and information storage devices. One or more of the information storage devices may store programs and data on removable storage media such as a floppy disk 508 or an optical disc 510. The chassis 502 may further comprise a network interface that allows the system 500 to receive information via a wired or wireless network, represented in FIG. 5 by a phone jack 512. The information storage media and information transport media (i.e., the networks) are collectively called "information carrier media."

The chassis 502 is coupled to the display 504 and the input device 506 to interact with a user. The display 504 and the input device 506 may together operate as a user interface. A user may interact with the display 504 and the input device 506 to access a database, such as the system of record 104, and generate reports, such as the report 106. Additionally, the user may interact with the display 504 and the input device 506 to execute the report checker 112 to validate the report 106. The display 504 is shown as a video monitor, but may take many alternative forms such as a printer, a speaker, or other means for communicating information to a user. The input device 506 is shown as a keyboard, but may similarly take many alternative forms such as a button, a mouse, a keypad, a dial, a motion sensor, a camera, a microphone or other means for receiving information from a user. Both the display 504 and the input device 506 may be integrated into the chassis 502.

Figure 6:
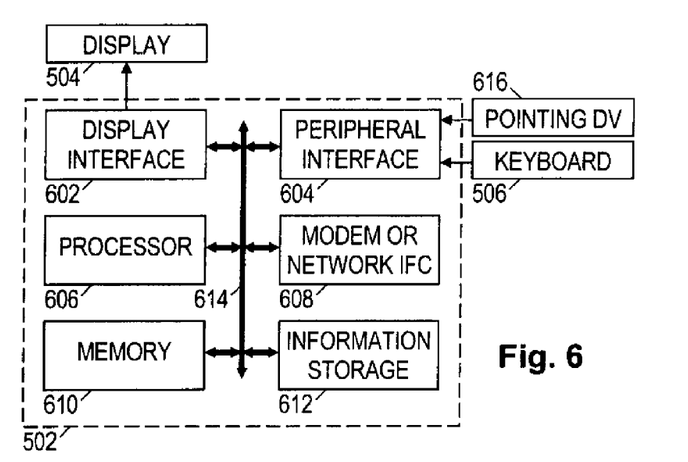
FIG. 6 shows a block diagram of an illustrative report validation tool.

FIG. 6 shows a simplified functional block diagram of the system 500. The chassis 502 may comprise a display interface 602, a peripheral interface 604, a processor 606, a modem or other suitable network interface 608, a memory 610, an information storage device 612, and a bus 614. The system 500 may be a bus-based computer, with the bus 614 interconnecting the other elements and carrying communications between them. The display interface 602 may take the form of a video card or other suitable display interface that accepts information from the bus 614 and transforms it into a form suitable for the display 504. Conversely, the peripheral interface 604 may accept signals from the keyboard 506 and other input devices such as a pointing device 616, and transform them into a form suitable for communication on the bus 614.

The processor 606 gathers information from other system elements, including input data from the peripheral interface 604, and program instructions and other data from the memory 610, the information storage device 612, or from a remote location via the network interface 608. The processor 606 carries out the program instructions and processes the data accordingly. The program instructions may further configure the processor 606 to send data to other system elements, comprising information for the user which may be communicated via the display interface 602 and the display 504. This information for the user can include information from the system of record 104 and a report based on information from the system of record 104, such as the report 106. The information for the user can also include the comparisons 120 between the elements 108 from the report 106 and the information from the system of record 104, as generated by the report checker 112.

The network interface 608 enables the processor 606 to communicate with remote systems via a network. The memory 610 may serve as a low-latency temporary store of information for the processor 606, and the information storage device 612 may serve as a long term (but higher latency) store of information. The memory 610 and the information storage device 612 may contain a database, such as the system of record 104, the report checker 112, the report 106 based on the system of record 104, and the comparisons 120 between the report 106 and the data 118.

The processor 606, and hence the desktop computer 500 as a whole, operates in accordance with one or more programs stored on the information storage device 612. The processor 606 may copy portions of the programs into the memory 610 for faster access, and may switch between programs or carry out additional programs in response to user actuation of the input device. The additional programs may be retrieved from the information storage device 612 or may be retrieved from remote locations via the network interface 608. One or more of these programs may configure the system 500 to support the system of record 104, generate the report 106 based on information from the system of record 104, and carry out at least one of the report validation methods disclosed herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method for validating reports, comprising:

Receiving, with a report checker stored as a set of computer executable instructions in a computer readable storage media executable by a processor, a request to validate a report generated from data contained in a system of record;

mapping with the report checker at least one element of the report to a template of independently defined logic;

applying with the report checker the template of independently defined logic to the data contained in the system of record to generate an expected result for the at least one element of the report;

determining with the report checker whether the at least one element of the report differs from the expected result for the at least one element of the report; and displaying with the report checker comparisons of the at least one element against the expected result when the at least one element of the report differs from the expected result, wherein displaying comparisons includes information identifying a location within the report from which the at least one element corresponds.

2. The computer implemented method of claim 1 wherein the at least one element consists of at least one element selected for validation.

3. The computer implemented method of claim 1 wherein displaying comparisons of the at least one element against the expected result consists of displaying comparisons of the at least one element against the expected result for comparisons that exceed a comparison tolerance.

4. The computer implemented method of claim 1 further comprising offering the corresponding template of independently defined logic to a report manager.

5. The computer implemented method of claim 1 wherein displaying comparisons of the at least one element against the data comprises displaying information used to generate the expected result.

6. The computer implemented method of claim 1 wherein the corresponding template of independently defined logic comprises instructions native to the system of record.

7. The computer implemented method of claim 6 wherein the instructions comprise structured query language.

8. A computer implemented system for validating reports, comprising:
 a memory; and
 a processor configured to execute report checker software in the memory, where the report checker is configured:
  to receive a request to validate a report generated from data contained in a system of record,
  map at least one element of the report to a template of independently defined logic,
  apply the template of independently defined logic to the data contained in the system of record to generate an expected result for the at least one element of the report;
  determine whether the at least one element of the report differs from the expected result for the at least one element of the report; and
  display comparisons of the at least one element against the expected result when the at least one element of the report differs from the expected result, wherein displaying comparisons includes information identifying a location within the report from which the at least one element corresponds.

9. The computer implemented system of claim 8 wherein the at least one element consists of at least one element selected for validation.

10. The computer implemented system of claim 8 wherein the data manager only displays comparisons of the at least one element against the expected result for comparisons that exceed a comparison tolerance.

11. The computer implemented system of claim 8 wherein the data manager is further operable to offer the corresponding template of independently defined logic to a report manager.

12. The computer implemented system of claim 8 wherein the data manager is further operable to display information used to generate the expected result.

13. The computer implemented system of claim 8 wherein the corresponding template of independently defined logic comprises instructions native to the system of record.

14. The computer implemented system of claim 13 wherein the independently defined logic comprises pre-defined logic.

15. A computer program product for validating reports, the computer program product comprising:
 a computer readable medium having computer readable program code embodied therein;
 computer readable program code configured to receive a request to validate a report generated from data contained in a system of record,
 computer readable program code configured to map at least one element of the report to a template of independently defined logic,
 computer readable program code configured to apply the template of independently defined logic to the data contained in the system of record to generate an expected result for the at least one element of the report;
 computer readable program code configured to determine whether the at least one element of the report differs from the expected result for the at least one element of the report; and
 computer readable program code configured to display comparisons of the at least one element against the expected result when the at least one element of the report differs from the expected result, wherein displaying comparisons includes information identifying a location within the report from which the at least one element corresponds.

16. The computer program product of claim 15 wherein the computer readable program code configured to display comparisons of the at least one element against the expected result consists of computer readable program code configured to display comparisons of the at least one element against the expected result for comparisons that exceed a comparison tolerance.

17. The computer program product of claim 15 wherein the at least one element consists of at least one element selected for validation.

18. The computer program product of claim 15 further comprising computer readable program code configured to offer the corresponding template of independently defined logic to a report manager.

19. The computer program product of claim 15 wherein the computer readable program code configured to display comparisons of the at least one element against the data consists of computer readable program code configured to display information used to generate the expected result.

20. The computer implemented method of claim 15 wherein the corresponding template of independently defined logic comprises instructions native to the system of record.

* * * * *

UNITED STATES PATENT AND TRADEMARK OFFICE
CERTIFICATE OF CORRECTION

PATENT NO. : 7,636,902 B1 Page 1 of 1
APPLICATION NO. : 11/611735
DATED : December 22, 2009
INVENTOR(S) : Forest V. Crittenden It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 391 days.

Signed and Sealed this

Ninth Day of November, 2010

David J. Kappos
*Director of the United States Patent and Trademark Office*